UNITED STATES PATENT OFFICE.

JOHN H. SCHENCK, OF ST. LOUIS, MISSOURI.

IMPROVED CONCENTRATED FOOD.

Specification forming part of Letters Patent No. 45,180, dated November 22, 1864; antedated July 15, 1863.

*To all whom it may concern:*

Be it known that I, JOHN H. SCHENCK, of the city of St. Louis and State of Missouri, have discovered a new mode of preparing concentrated food for man and beast; and I hereby declare that the following is a true and exact description of the mode of preparing said food.

The ingredients of my concentrated food are Indian corn, oats, and barley reduced to the condition of meal and sufficiently bolted to get rid of the husk or exterior covering of the grain. The three ingredients are then mixed in the following proportions, to wit: six measures of Indian corn, one measure of oats, and one of barley. These proportions may be varied without serious injury to the quality of the food, with the exception of the barley, the proportion of which, if materially varied, will be likely to produce fermentation in the mass, and thus impair, if it does not entirely destroy, the value of the food. The first step after mixing the ingredients in the above proportions is to moisten the mass thoroughly with cold water, after which the water is gradually evaporated by a sufficient degree of heat to soften all the particles of the mass and render them adhesive. This may be done either by reducing the whole to a thin paste, and then by a process of evaporation bringing it to the condition of thick mush, or by submitting it to the action of steam for a sufficient time. In either case the evaporation must continue until the composition is brought to such a degree of stiffness as may not render it liable to be scorched or burned. The composition must then be spread thinly upon metal pans in a close room and subjected to a degree of heat ranging from 150° to 210° of Fahrenheit until the moisture be entirely evaporated. In this process care must be observed not to scorch the ingredients. The composition thus prepared must then be placed in heavy molds constructed for the purpose, the mass having been previously divided in cakes, each cake representing a United States army ration, and subjected to a pressure of from five to seven thousand pounds to the inch and reducing the cakes to about one-third of their original bulk. When taken out of the molds the material must again be placed in a heated room and subjected to a like process of evaporation until every particle of moisture be removed and all danger of fermentation entirely avoided. The food may then be preserved for years with its virtues unimpaired.

Oil-cake or any ordinary medicated preparation may be introduced in this food without injury.

Having thus described my discovery, what I claim, and desire to secure by Letters Patent, is—

The mode of preparing concentrated food for man and beast, in the manner herein fully set forth and described.

J. H. SCHENCK.

Witnesses:
   CHARLES ALEXANDER,
   S. WOLF.